United States Patent [19]
Fisch et al.

[11] Patent Number: 5,791,627
[45] Date of Patent: Aug. 11, 1998

[54] MOUNTING SYSTEM FOR AUTOMOTIVE INTERNAL COMBUSTION ENGINE

[75] Inventors: Ronald Frederick Fisch, Detroit; Mark Hollis Jackson, Grosse Ile, both of Mich.

[73] Assignee: Ford Global Technologies, Inc., Dearborn, Mich.

[21] Appl. No.: 826,180

[22] Filed: Mar. 27, 1997

[51] Int. Cl.$^6$ .................. F16M 13/00; A47B 96/06; F16B 37/06; F16B 37/16
[52] U.S. Cl. .................. 248/543; 248/544; 248/221.12; 248/222.13; 411/171; 411/437
[58] Field of Search .................. 248/543, 544, 248/221.12, 222.13, 222.41, 230.2, 909; 411/386, 409, 104, 116, 171, 437

[56] References Cited

U.S. PATENT DOCUMENTS

| | | | |
|---|---|---|---|
| 3,916,757 | 11/1975 | Wilson | 411/386 |
| 4,121,495 | 10/1978 | Malo et al. | 85/1 H |
| 5,078,369 | 1/1992 | Pascal et al. | 267/140.1 A |
| 5,251,865 | 10/1993 | Kelly | 248/634 |
| 5,407,310 | 4/1995 | Kassouni | 411/107 |
| 5,507,585 | 4/1996 | Diederich et al. | 403/347 |
| 5,524,860 | 6/1996 | Ives | 248/674 |
| 5,567,074 | 10/1996 | Dovak et al. | 403/197 |

FOREIGN PATENT DOCUMENTS

| | | |
|---|---|---|
| 0367328 A1 | 5/1990 | European Pat. Off. . |
| 2227560 | 6/1979 | Germany . |
| 3934591 A1 | 4/1991 | Germany . |

*Primary Examiner*—Leslie A. Braun
*Assistant Examiner*—Michael Nornberg
*Attorney, Agent, or Firm*—Jerome R. Drouillard

[57] ABSTRACT

An engine mounting system for an internal combustion engine includes a bracket adapted for attachment to an engine and detachable locator members which are attached to fasteners extending axially from the bracket through the frame member of a vehicle. The detachable locator members wedge the engine mounting brackets into a desired location upon the frame crossmember. Once the engine has been decked, the locator members may be removed so as to allow installation of additional fastening elements.

18 Claims, 2 Drawing Sheets

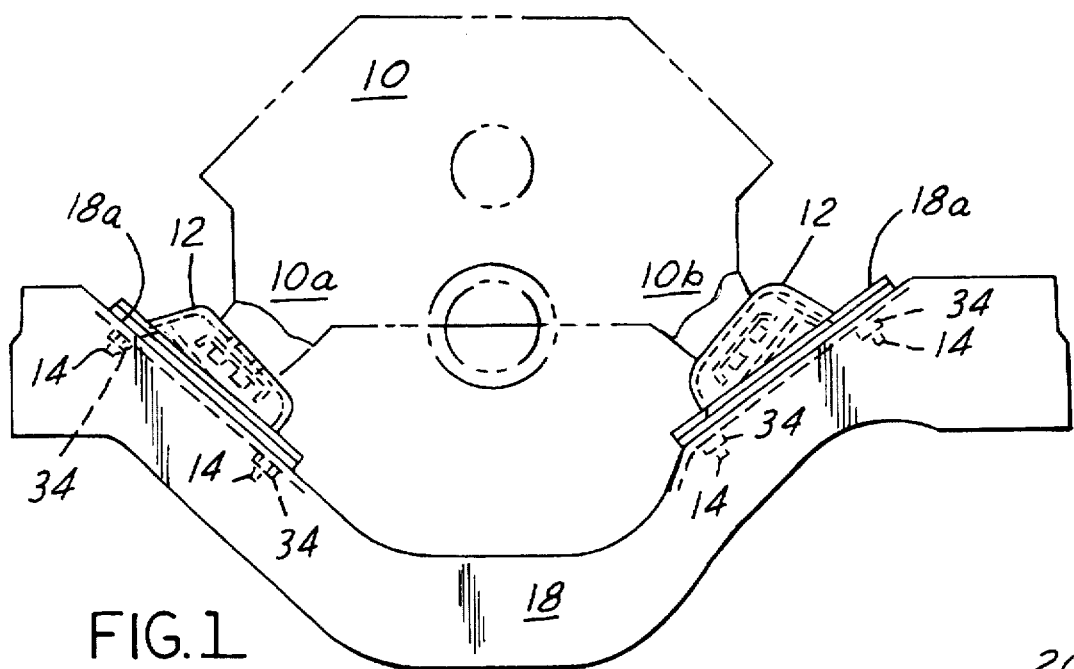
FIG. 1
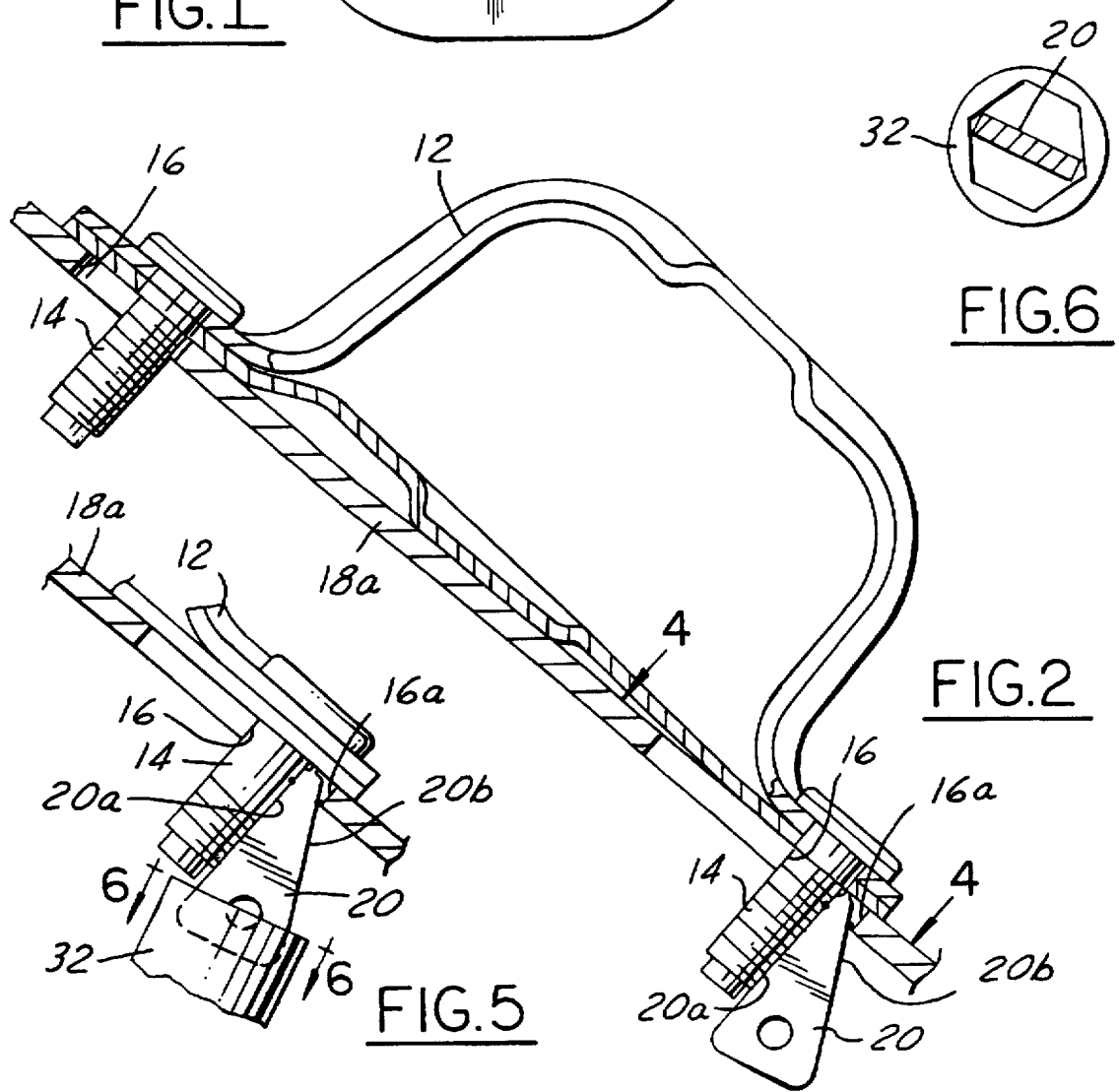
FIG. 6
FIG. 2
FIG. 5

5,791,627

MOUNTING SYSTEM FOR AUTOMOTIVE INTERNAL COMBUSTION ENGINE

BACKGROUND OF THE INVENTION

1. Field of the Invention

The present invention relates to a bracket system with a removable positioning aid for mounting an engine in an automotive vehicle according to a predetermined, correct orientation.

2. Background Information

Automotive engine mounts typically include a bracket member which is bolted rigidly to the engine and which has a rubber element interposed between the bracket member bolted to the engine and a second bracket member which is bolted to either frame mounted stand-off mounts or to a crossmember of the vehicle's frame. In order to provide sufficient clearance to allow decking of the engine during the vehicle assembly process, it is frequently necessary to elongate, or slot, apertures formed in the crossmember for allowing passage of threaded fasteners from the engine mount bracket through the crossmember, such that a nut may be attached to the threaded fastener(s) from underneath the crossmember, thereby securing the engine to the crossmember. Unfortunately, provision of slotted apertures in a crossmember, while allowing the engine to be mated with the crossmember, also permits the engine to rotate, generally about its crankshaft axis, thereby allowing the engine to be seated in an uneven or nonhorizontal fashion upon the crossmember to which it is bolted. This is undesirable because linkages, such as throttle, clutch, and gearshift as well as members such as exhaust pipes, fuel lines, air lines, hydraulic lines, electrical cables, etc., may be adversely affected if the engine is not positioned correctly. And, the elastomeric component of the engine mounts may be preloaded in shear, which may cause a problem with excessive noise, vibration, and harshness.

The inventors of the present engine mount system have determined that secure and yet locationally correct mounting of an engine may be achieved by providing a detachable locator member, such as a two-sided wedge, which will precisely locate the engine through wedging action provided when the weight of the engine forces the wedge into a trapped position between a wall of an aperture through which one of the engine retaining fasteners passes and a shank of the fastener to which the wedge is welded or otherwise bonded or attached.

SUMMARY OF THE INVENTION

An engine mounting system for an internal combustion engine includes a multipiece bracket adapted for attachment to an engine and a plurality of fasteners extending axially from the bracket, with the fasteners being adapted for engagement with apertures formed in a frame member of an automotive vehicle. A detachable locator member attached to at least one of the fasteners extends along and in contact with a substantial portion of the axial length of at least one fastener such that the position of the bracket with respect to the frame member will be determined in part by interposition of the locator member between said at least one fastener and a wall of at least one of the apertures when the bracket is placed in contact with the frame member.

According to another aspect of the present invention, a detachable locator for use with an automotive engine mount bracket may comprise a two-sided wedge having a first wedging surface in contact with at least one fastener extending axially from the mount bracket, and a second wedging surface in contact with a wall of an aperture through which the fastener extends, such that the wedge may be removed after the bracket has been placed in contact with the frame member.

A wedge according to the present invention may be removed from the fastener to which it is initially bonded by subjecting the wedge to rotation about an axis extending generally parallel to the first wedging surface, so as to break the attachment bond existing between the fastener and the wedge.

In another embodiment, a detachable locator comprises an elongated wedge having a base surface extending parallel to and in contact with the shank of at least one fastener projecting through the mount bracket, with the detachable locator further having a wedging surface in contact with a wall of one of the engine crossmember apertures, with the wedging surface having a ramp portion of varying thickness, with the ramp first contacting the wall of the aperture during installation of the bracket on the frame crossmember as well as a land portion which is parallel to the base surface and which contacts the wall of the aperture when the bracket has been placed in contact with the frame member.

It is an advantage of the present invention that an engine mounting system according to the present invention may be employed to allow quick, yet precise positioning of an engine in an automotive vehicle without the use of any particular special fixtures or equipment.

It is a further advantage of the present invention that an engine mounting system according to this invention will assure that an engine is mounted in a neutral position in a vehicle, without preloading the engine mounts, and without unduly rotating the engine about an axis parallel to the crankshaft. In this manner undesirable noise, vibration, and harshness will be avoided.

Other features, advantages of the present invention will become apparent to the reader of this specification.

BRIEF DESCRIPTION OF THE DRAWINGS

FIG. 1 is a schematic representation of an engine and automotive frame and engine mounting system according to the present invention.

FIG. 2 is a sectional view, partially cut-away of an engine mounting system according to the present invention.

FIG. 5 is a sectional view, partially cut-away illustrating the installed position of a detachable locator wedge according to the present invention.

FIG. 6 is taken along the line 6—6 of FIG. 5, illustrating the use of a socket wrench to remove a detachable locator wedge according to the present invention.

DETAILED DESCRIPTION OF THE PREFERRED EMBODIMENTS

Figure 3:
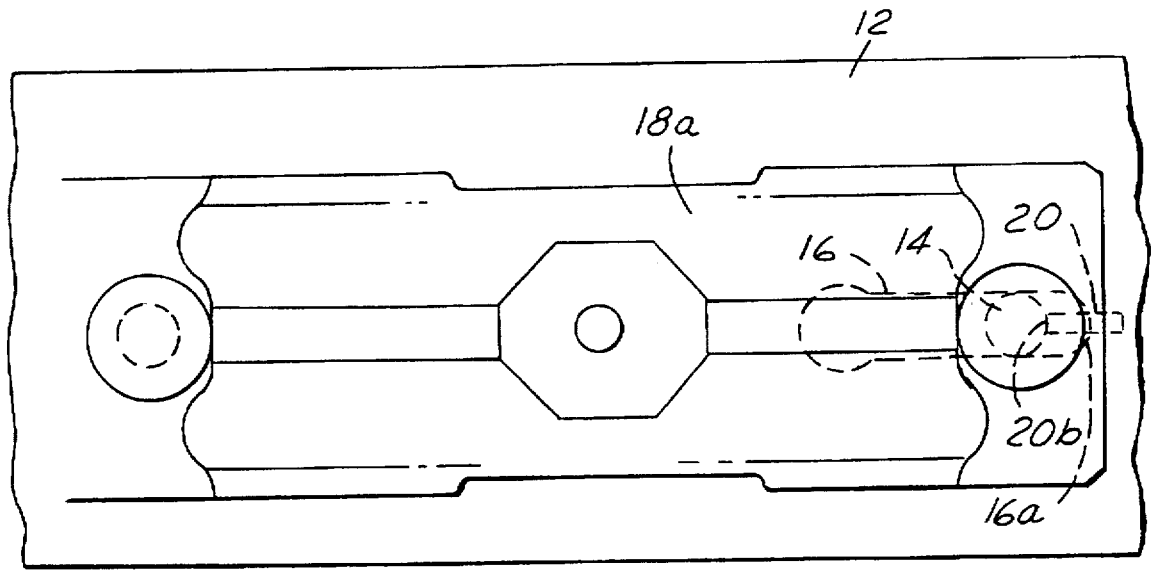
FIG. 3 is a plan view, partially cut-away of an engine mounting system according to the present invention.
Figure 4:
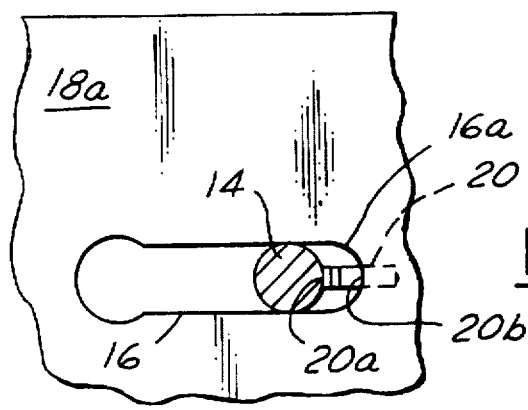
FIG. 4 is a plan view, partially cut-away of a mounting system including a wedge and cylindrical fastener according to the present invention.

As shown in FIG. 1, engine 10 is retained to crossmember 18 of an automotive frame by means of brackets 12. As used herein, the term "bracket" refers to the previously described assembly including multiple elements. Each of brackets 12 has a plurality of bolts 14 extending therefrom through mounting tab 18a formed in crossmember 18. Those skilled in the art will appreciate in view of this disclosure that although engine 10 is shown as having a V-type configuration with two sides 10a and 10b, the present engine mounting system could be employed with other types of engines such as in-line engines.

As shown in FIG. 2, bracket 12 has a plurality of fasteners, in this case threaded bolts 14, which extend axially from bracket 12 through a plurality of apertures 16 formed in crossmember 18. As observable from FIGS. 2 through 5, apertures 16 are slotted so as to allow ready installation of engine 10 to crossmember 18. FIGS. 2 through 5 additionally show two-sided wedge 20 which extends along and in contact with a substantial portion of the axial length or shank of at least one of fasteners 14. Notice that the location of wedge 20 as well as its thickness and configuration, determine the position of bracket 12 with respect to crossmember 18. This is because wedge 20 is trapped between the shank of fastener 14 and wall 16a of one of apertures 16. Once engine 10 has been located in the position shown in FIGS. 2–5, detachable locator 20 may be removed by twisting with socket wrench 32.

The inventors of the present invention have determined that removal of wedge 20 after location of engine 10 upon crossmember 18, but prior to installation of nuts upon bolts 14, will not cause the position of engine 10 to shift upon crossmember 18. Thus, a nut, shown at 34 in FIG. 1, may be run onto each of fasteners 14 so as to complete installation of the engine mounting system and engine without disrupting the location determined by wedge 20.

Figure 7:
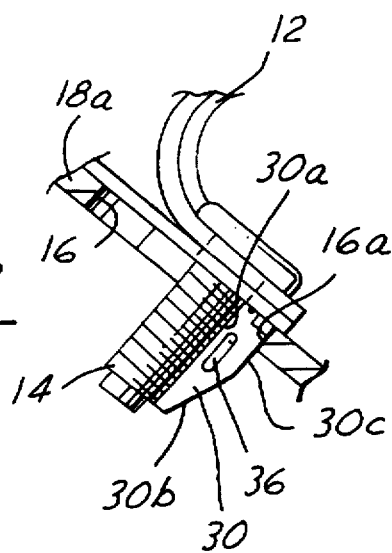

Details of the wedges illustrated herein are merely exemplary of a class of wedges suitable for use according to the present invention. The two-sided wedge of FIGS. 2–6 includes the first wedging surface 20a which is in contact with shank of fastener 14 and a second wedging surface 20b which is in contact with wall 16a of aperture 16. Two-sided wedge 20 may be removed by rotating the wedge with socket 32 about axis extending parallel to wedging surface 20a. In contrast, slider wedge 30, shown in FIGS. 7 and 8, may be removed by engaging screwdriver slot 36 with a screwdriver or other tool, thereby allowing slider wedge 30 to be rotated so as to break the attachment bond existing between slider wedge 30 and fastener 14. Slider wedge 30 has base surface 30a which is in contact with fastener 14. Slider wedge 30 is shown in FIG. 7 as being welded to a portion of bracket 12. However, slider wedge 30 may be welded to fastener 14 as is two-sided wedge 20 as shown in FIGS. 2 and 5.

Slider wedge 30 has a wedging surface with the ramp portion 30b of varying thickness which first contacts wall 16a of aperture 16 during installation of bracket 12 on crossmember 18, and a land portion 30c which determines the final position of bracket 12 upon frame member 18.

Figure 8:
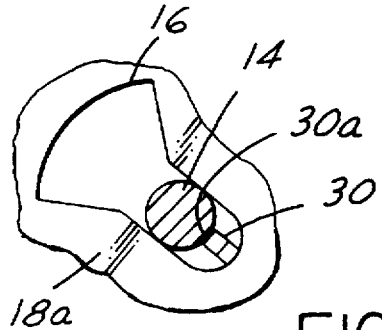
FIGS. 7 and 8 illustrate the second embodiment of a removable locator according to the present invention.

Finally, in yet another embodiment which is shown in FIG. 8, an engine mounting system according to the present invention may include a modification wherein the apertures in contact with the removable locators are fan shaped, with the apertures each having a wide portion and a narrow root portion, and with the locators being in contact with walls associated with the root portion when the engine is in a fully installed position.

While the invention has been shown and described in its preferred embodiments, it will be clear to those skilled in the arts to which it pertains that many changes and modifications may be made thereto without departing from the scope of the invention.

We claim:

1. An engine mounting system for an internal combustion engine, comprising:
    a bracket adapted for attachment to an engine;
    a plurality of fasteners extending axially from said bracket, with said fasteners being adapted for engagement with apertures formed in a frame member of an automotive vehicle; and
    a detachable locator member attached to at least one of said fasteners, with said locator member extending along and in contact with a substantial portion of the axial length of said least one fastener such that the position of the bracket with respect to said frame member will be determined in part by interposition of the locator member between said at least one fastener and a wall of at least one of said apertures when said bracket is placed in contact with the frame member whereby the detachable locator member is removed after the bracket has been placed in contact with the frame member.

2. An engine mounting system according to claim 1, wherein said detachable locator comprises a two-sided wedge having a first wedging surface in contact with said at least one fastener and a second wedging surface in contact with said wall of said aperture such that the wedge may be removed after the bracket has been placed in contact with the frame member.

3. An engine mounting system according to claim 2, wherein said wedge may be removed from said at least one fastener by subjecting the wedge to rotation about an axis extending generally parallel to the first wedging surface, so as to break an attachment existing between said at least one fastener and said wedge.

4. An engine mounting system according to claim 3, wherein said at least one generally cylindrical fastener comprises a threaded fastener.

5. An engine mounting system according to claim 4, wherein said wedge is removable by rotation imparted by a socket wrench sized to drive a securing fastener upon said at least one generally cylindrical fastener.

6. An engine mounting system according to claim 1, wherein said fasteners comprise threaded bolts and said detachable locator comprises a triangular wedge welded to the bracket and having one leg of the triangle extending parallel to and in contact with at least one of said bolts.

7. An engine mounting system according to claim 1, wherein said fasteners comprise threaded bolts and said detachable locator comprises a triangular wedge welded to the bracket and having one leg of the triangle extending parallel with and welded to said at least one of said bolts.

8. An engine mounting system according to claim 1, wherein said detachable locator comprises an elongated wedge which may be removed after the bracket has been placed in contact with the frame member, with said wedge having a base surface extending parallel to and in contact with said at least one fastener and a wedging surface in contact with said wall of said aperture, with said wedging surface having a ramp portion of varying thickness which first contacts the wall of the aperture during installation of the bracket on a frame member and a land portion which is parallel to the base surface and which contacts the wall of the aperture when the bracket has been placed in contact with a frame member.

9. An engine mounting system according to claim 8, wherein said locator has a slotted aperture engageable with a prying tool so as to permit detachment of the locator from said at least one generally cylindrical fastener.

10. An engine mounting system for an internal combustion engine, comprising:

a bracket adapted for attachment to an engine;

a plurality of threaded fasteners having shanks extending axially from said bracket, with said fasteners being adapted for engagement with apertures formed in a crossmember of an automotive vehicle frame; and a detachable locator member attached to at least one of said threaded fasteners, with said locator member extending along and in contact with a substantial portion of the shank of said least one fastener such that the position of the bracket with respect to said frame member will be determined in part by interposition of the locator member between said at least one fastener and a wall of at least one of said apertures when said bracket is placed in contact with the crossmember whereby the detachable locator member is removed after the bracket has been placed in contact with the frame member.

11. An engine mounting system according to claim 10, wherein said locator member is attached to the shank of said at least one threaded fastener with at least one weld, with said weld being fracturable so as to allow said locator to be detached from said at least one threaded fastener.

12. An engine mounting system for an automotive internal combustion engine, comprising:

an engine;

a bracket attached to the engine;

a frame crossmember extending generally laterally of a vehicle and having a plurality of apertures formed therein;

a plurality of threaded fasteners extending axially from said bracket, with said fasteners extending through said apertures in said crossmember; and a detachable locator member attached to at least one of said threaded fasteners, with said locator member extending along and in contact with a substantial portion of the axial length of said least one fastener such that the position of the bracket with respect to said frame member will be determined in part by interposition of the locator member between said at least one fastener and a wall of at least one of said apertures when said bracket is placed in contact with the frame member whereby the detachable locator member is removed after the bracket has been placed in contact with the frame member.

13. An engine mounting system according to claim 12, wherein said locator member is attached to said at least one threaded fastener with at least one weld, with said weld being fracturable so as to allow said locator to be detached from said at least one threaded fastener.

14. An engine mounting system according to claim 12, wherein said crossmember has a mounting pad for receiving the bracket, with the mounting pad being inclined from the horizontal so as to cause the locator member to be trapped between said at least one threaded fastener and the wall of said aperture when the engine is mounted to the crossmember.

15. An engine mounting system according to claim 14, wherein said engine has a two-sided v-block configuration, with at least one of said engine mounting brackets being attached to each side of said v-block.

16. An engine mounting system according to claim 15, wherein the weight of said engine causes said locator members to become trapped between the threaded fastener to which each locator member is attached and a wall of the aperture through which the threaded fastener extends.

17. An engine mounting system according to claim 12, wherein said aperture in contact with said removable locator is fan shaped, with said aperture having a wide portion and a narrow portion, and with said locator being in contact with a wall associated with said narrow portion when the engine is in a fully installed position.

18. An engine mounting system according to claim 12, wherein said at least one aperture is fan shaped, with said aperture having a root portion in contact with one of said threaded fasteners.

* * * * *